Aug. 11, 1925.
N. M. PATRICK
1,549,500
VALVE FOR USE AT GAS FILLING STATIONS
Filed April 9, 1925
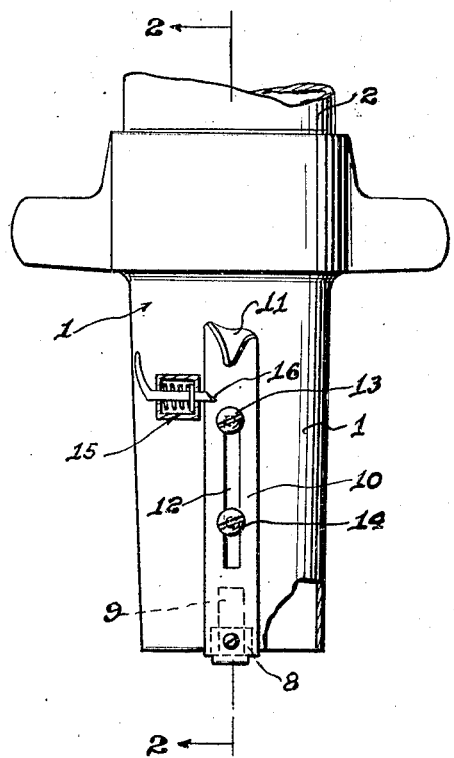
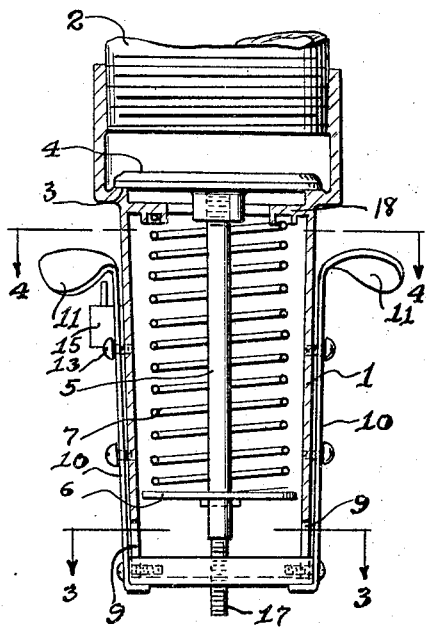
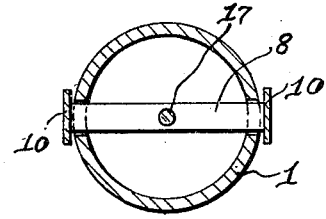
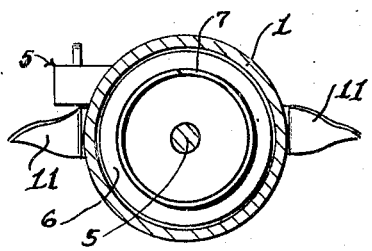
Inventor
Noble M. Patrick
By Lester L. Sargent
Attorney Patented Aug. 11, 1925.

1,549,500

UNITED STATES PATENT OFFICE.

NOBLE M. PATRICK, OF CHARLOTTE, NORTH CAROLINA, ASSIGNOR OF ONE-HALF TO P. W. HORN, OF MECKLENBURG COUNTY, NORTH CAROLINA.

VALVE FOR USE AT GAS-FILLING STATIONS.

Application filed April 9, 1925. Serial No. 21,929.

*To all whom it may concern:*

Be it known that I, NOBLE M. PATRICK, a citizen of the United States, residing at Charlotte, in the county of Mecklenburg and State of North Carolina, have invented a new and useful Valve for Use at Gas-Filling Stations, of which the following is a specification.

The object of my invention is to provide a valve for the nozzle of the hose attached to pumps used at gas filling stations whereby to prevent waste of gasolene which may remain in the hose. I attain these and other objects of my invention by the device illustrated in the accompanying drawings, in which—

Figure 1 is a side elevation of my invention with a portion of the nozzle broken away;

Fig. 2 is a longitudinal section through the line 2—2 of Fig. 1;

Fig. 3 is a transverse section on line 3—3 of Fig. 2; and

Fig. 4 is a transverse section on line 4—4 of Fig. 2.

Like numerals indicate like parts in each of the several views.

Referring to the accompanying drawings 1 designates the nozzle which is suitably attached to the hose 2. I provide a valve 4 seating on the inwardly projecting annular shoulder 3 of the nozzle 1. Attached to valve 4 is a valve stem 5, to the other end of which is attached the disk 6. I provide a coiled spring 7 interposed between disk 6 and the shoulder 18 of the nozzle, as shown in Fig. 2. Nozzle 1 is provided with slots 9 to receive the bar 8 which is attached to the metal handle straps 10 which terminate in the outturned ears 11. The bar 8 is attached to the valve stem 5 by threaded engagement with the threaded end 17 of the valve stem. Each handle strap 10 is provided with longitudinal slots 12 through which extend the screws 13 and 14 attached to the nozzle, as shown in Fig. 1 to guide the straps on the nozzle. I provide a suitable spring catch 15 attached to nozzle 1 and releasably engaging the catch of strap 10.

The operation of the device will be apparent from the accompanying drawings. The valve 4 seats on the annular shoulder 3 and is normally held on its seat by the spring 7. When it is desired to discharge gasolene through the nozzle the valve is raised by means of pressure exerted against one or both of the ears 11 of straps 10. These members in turn cause bar 8 to slide upwardly in the slots 9 and raise valve stem 5 and valve 4 from its seat. As soon as pressure is released from the ears 11 of straps 10 the spring 7 and also the pressure of the gasolene in the pipe 2 will cause the valve to reseat and close the nozzle. The spring catch 15 latches the straps in position to hold the valve on its seat so that gasolene may not be accidentally spilled when the device is not in use.

What I claim is:

1. In a valve of the class described, the combination of a nozzle having an inwardly projecting encircling shoulder, a valve seating on the aforesaid shoulder, resilient means normally holding the valve on its seat, means for operating the valve, said means including a valve stem, a bar to which the end of the valve stem is attached, the nozzle having slots in which the bar is slidable, handle straps attached to the bar and positioned exteriorly of the nozzle for operating the valve, the straps having longitudinal slots, and spaced members mounted on the nozzle and projecting through the slots.

2. In a valve of the class described, the combination of a nozzle having an inwardly projecting encircling shoulder, a valve seating on the aforesaid shoulder, resilient means normally holding the valve on its seat, means for operating the valve, said means including a valve stem, a bar to which the end of the valve stem is attached, the nozzle having slots in which the bar is slidable, handle straps attached to the bar and positioned exteriorly of the nozzle for operating the valve, the straps having longitudinal slots, spaced members mounted on the nozzle and projecting through the slots and a spring catch releasably engaging one of the straps and adapted to lock the straps in position to hold the valve on its seat.

NOBLE M. PATRICK.